United States Patent [19]

Dankowski

[11] Patent Number: 4,567,734

[45] Date of Patent: Feb. 4, 1986

[54] AIR DEFLECTOR-AIR CONDITIONER CONDENSER INTEGRATED UNIT

[75] Inventor: Gerhard Dankowski, Royse City, Tex.

[73] Assignee: Danhard, Inc., Dallas, Tex.

[21] Appl. No.: 646,056

[22] Filed: Aug. 31, 1984

[51] Int. Cl.[4] ............................................. F25D 17/04
[52] U.S. Cl. ....................................... 62/186; 62/241; 62/244; 62/507
[58] Field of Search ................. 62/507, 241, 239, 244, 62/186; 296/91

[56] References Cited

U.S. PATENT DOCUMENTS

| | | | |
|---|---|---|---|
| 1,973,116 | 9/1934 | Shutts | 62/241 |
| 2,162,512 | 6/1939 | McPherson et al. | 62/117 |
| 2,443,472 | 6/1948 | Mayo et al. | 62/241 X |
| 2,779,143 | 7/1957 | Weigel | 62/244 X |
| 2,784,563 | 3/1957 | Schjolin | 62/117 |
| 2,869,333 | 1/1959 | Hoiby et al. | 62/239 |
| 2,922,293 | 1/1960 | Peix | 62/243 |
| 3,163,995 | 1/1965 | Maier | 62/507 X |
| 3,287,852 | 11/1966 | Belden | 98/121 A X |
| 3,421,340 | 1/1969 | Von Berg | 62/239 |
| 3,738,621 | 6/1973 | Anderson | 62/241 X |
| 3,983,715 | 10/1976 | Hair, Jr. et al. | 62/243 |
| 4,078,395 | 3/1978 | Crowe et al. | 62/239 |
| 4,217,764 | 8/1980 | Armbruster | 62/323 |
| 4,310,192 | 1/1982 | Fitzgerald | 296/15 |
| 4,345,641 | 8/1982 | Hauser | 165/41 |

*Primary Examiner*—William E. Tapolcai
*Attorney, Agent, or Firm*—Richards, Harris, Medlock & Andrews

[57] ABSTRACT

An air deflector unit for use on a vehicle to improve aerodynamic flow of air around the vehicle includes a forward facing shield having a forward facing air inlet therein and an inwardly facing air exhaust. An air flow passage is defined between the air inlet and the air exhaust. An air conditioning compressor is mounted in the air flow passage. Flow of air through the condenser is controlled by controlling louvers positioned in the inlet. Control is in response to the operation of the air conditioning system of which the compressor is a part.

18 Claims, 5 Drawing Figures

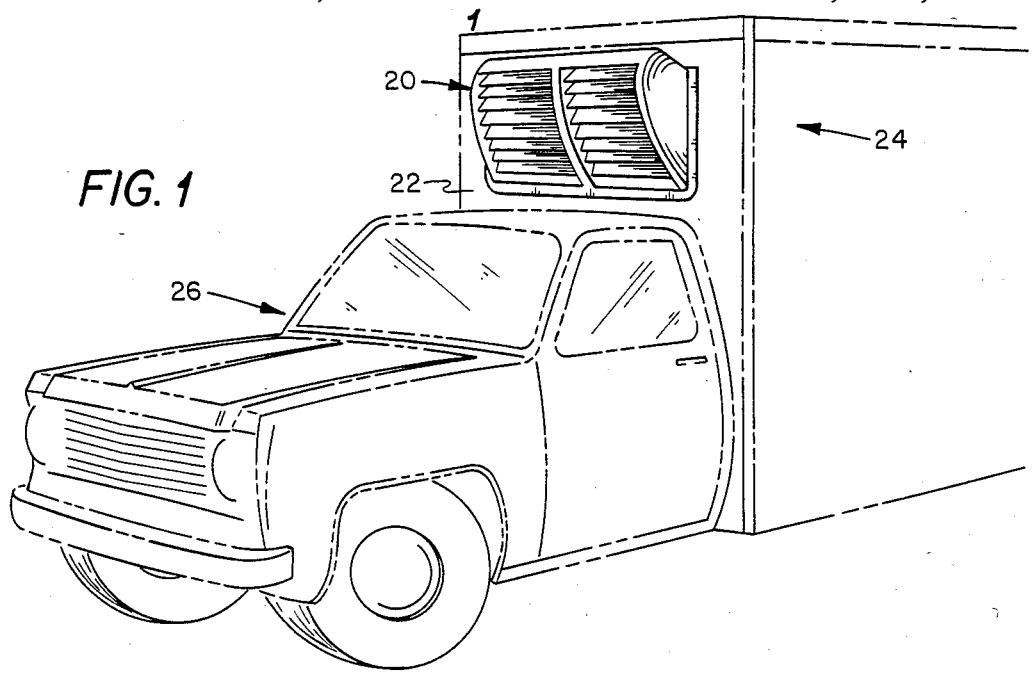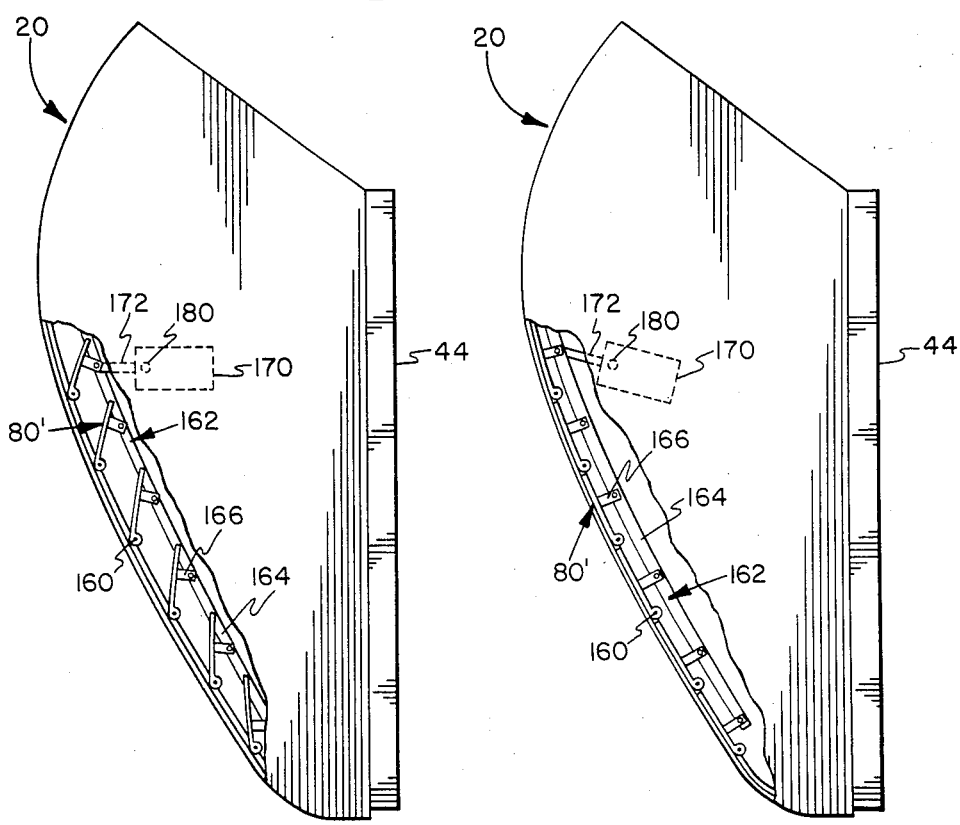
FIG. 1
FIG. 3a
FIG. 3b

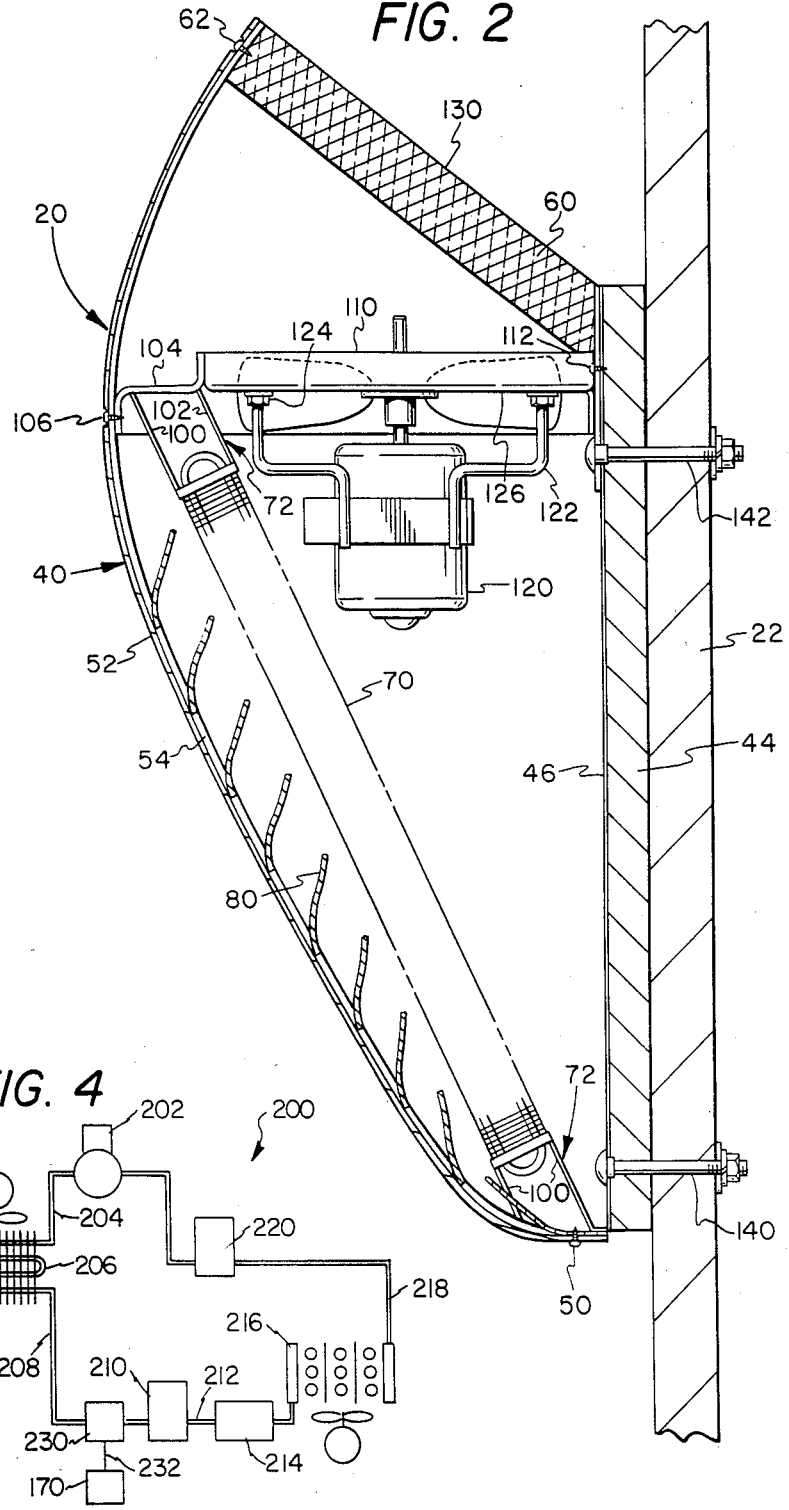

AIR DEFLECTOR-AIR CONDITIONER CONDENSER INTEGRATED UNIT

TECHNICAL FIELD

The present invention relates to a structure which combines the condenser of an air conditioner unit as an integral part of an air deflector used in vehicles to aerodynamically improve air flow relative to the vehicle.

BACKGROUND ART

For years, various components necessary for providing air conditioning to vehicles, including automobiles, trucks and large transport vans, have been mounted with various components of the units on the exterior of the vehicle. This is particularly the case for add on components where there is insufficient room in the engine compartment for various components of the air conditioning system.

It is particularly significant that the condenser be mounted in a location where sufficient air flow can be directed therethrough to provide the heat transfer function necessary to cool the refrigerant used in the air conditioning system. The condenser has been variously mounted on the vehicles and generally in a position to directly confront the air stream encountered by the vehicle as it moves in the forward direction. This results in substantial aerodynamic drag and thus affects the operating efficiency of the vehicle. Further, these systems are normally designed such that air flow is directed through the condenser regardless of need. Thus, even though the heat exchange provided by the air flow through the condenser may not be needed at particular times of operation, flow through the condenser is provided and such flow is accompanied by air resistance and corresponding drag.

DISCLOSURE OF THE INVENTION

The present invention is directed to a combination air deflector and air conditioning condenser housing which overcomes many of the deficiencies enumerated in the prior art above. In accordance with one embodiment of the invention, an air deflector and air conditioner condenser combined unit is provided including an aerodynamic deflector shield having an air inlet therethrough. An air exhaust is provided remote from the inlet and an air flow path is defined between the inlet and the exhaust. The air conditioner condenser is mounted within the air flow path. The air deflector and air conditioner condenser combination is mounted to a vehicle such that the inlet faces forwardly in the direction of normal vehicle movement. In this way, air engages the deflector as the vehicle is operated in forward motion.

In one embodiment of the invention, the air inlet is provided with fixed vanes which direct air engaging the air deflector into and through the air conditioner condenser. As the vehicle on which the unit is mounted moves, a portion of the air which engages the deflector is directed by the deflector around the vehicle to improve aerodynamic flow. A portion of the air is permitted through the deflector by way of the inlet and through the condenser. The flow exits from behind the deflector through the exhaust opening.

In still a further embodiment of the invention, the air inlet is a variable area inlet and the unit includes structure for controlling the variable area provided by the inlet. In this embodiment, movable louvers may be incorporated which are controlled in response to the operation of the air conditioner unit. Specifically, as the head pressure in the unit exceeds a particular value, the louvers are opened to provide more flow therethrough and through the condenser. As less heat exchange is needed, as indicated by a reduced head pressure, the variable area inlet is closed and the unit acts more as an air deflector to improve aerodynamic flow therearound.

Blowers are provided within the air flow path downstream of the condenser and ahead of the air exhaust to draw air through the condenser as required. These blower units may be operated in conjunction with the operation of the air conditioner system as needed.

In the present invention, the condenser may be designed to act as a load bearing structure to support the forward facing air deflector shield. In this way, the shield structure may be reduced in size and a material and weight savings may be realized. It will be appreciated by those skilled in the art that in some embodiments, the condenser will not be a load bearing structure in view of the design and construction of the condenser and its associated components.

In accordance with still another embodiment of the invention, the condenser is mounted over the full inlet opening and a wire expanded or similar screen is mounted in the inlet ahead of the condenser. In this way, the condenser and expanded screen act as a partial deflector of the air and at the same time permit the entry of a portion of the air for passage through the condenser.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 1 is a perspective view of the air deflector and air conditioning condenser combined unit;

FIG. 2 is a vertical section view thereof;

FIGS. 3a and 3b show an alternative embodiment of the arrangement shown in FIGS. 1 and 2;

FIG. 4 is a schematic of a typical air conditioning system showing the position of the pressure sensor for controlling the opening to the air deflector and air conditioning condenser unit.

DETAILED DESCRIPTION

Referring to FIG. 1 in conjunction with FIG. 2, an air deflector and air conditioner condenser combination unit 20 is shown mounted on the front wall 22 of a trailer 24 of truck 26. Unit 20 includes a curvilinear deflection shield 40 having openings 42 defined therein. Shield 40 includes an outer skin 52 and an inner skin 54. A bulk head 44 is connected to shield 40 by way of a rear support plate 46 attached at the lower end by screws 50. Outer skin 52 may be fabricated from rolled steel while inner skin 54 may be fabricated from expanded metal. The upper end of shield 40 is attached by brace 60 to bulk head 44. Attachment of brace 60 to shield 40 is by appropriate screws, such as screws 62. An air conditioner condenser 70 is mounted adjacent openings 42 and is supported by a bracket assembly 72. As is well known in the art, condenser 70 is a part of a complete air conditioning system, including an evaporator, compressor, dehydrator and other components as is required. In the embodiment of FIGS. 1 and 2, stationary louvers 80 are formed in inner skin 54 and are positioned between condenser 70 and openings 42, having a curvilinear design as shown. It will be appreciated by those skilled in the art that louvers 80 may be of other designs as necessary to direct air flow toward condenser 70. In arrangements where unit 20 is mounted such that the condenser is substantially perpendicular to the air stream (as in FIG. 1), expanded metal may be used in the place of the louvers formed in skin 54. As will be shown in alternative embodiments, louvers 80 may be variable to permit changing of the flow through the shield to the condenser.

As can be seen in FIGS. 1 and 2, the positioning of louvers 80 and condenser 70 are such that ram air encountered by the unit is in part directed through openings 42 and condenser 70, with a portion of the air being deflected around the shield and the vehicle trailer.

Bracket assembly 72 includes extensions 100 for attachment to shield 40. Extension 102 extends from the upper, rearward face of condenser 70 and attaches to a blower motor bracket 104. Bracket 104 is attached at one end by appropriate screws 106 to shield 40 and supports, at the opposite end, a blower motor bracket fitting 110. Fitting 110 is connected to rear bulk head 44 by appropriate screws 112. A blower motor 120 is supported from fitting 110 by support arms 122. Adjustment is provided by nuts 124 engaged on the threaded end of arms 122 on opposite sides of flange 126 of fitting 110.

An exhaust outlet 130 is defined between shield 40 and bulk head 44 above blower motor 120. As can be seen in FIGS. 1 and 2, an air flow channel 132 is defined between the inlet defined by openings 42, and exhaust outlet 130. Condenser 70 and blower motor 120 are positioned in the path of this air flow channel. As can be seen in FIG. 2, the entire unit may be mounted to the wall of trailer 24 using appropriate bolts 140 and 142.

Referring now to the embodiment of FIGS. 3a and 3b, there is shown an arrangement wherein louvers 80' are pivotable about individual axis shafts 160. Louvers 80' are controlled by a linkage assembly 162 including a control shaft 164 pivotally connected to linkage arms 166. As can be seen in FIG. 3, by movement of linkage assembly 162, louvers 80' may be pivoted about axis shafts 160 between a closed position (FIG. 3b) and an open position (FIG. 3a). Control shaft 164 may be controlled by any one of several known control means. For example, a solenoid 170 may be used, having a plunger 172 connected to the control shaft. As plunger 172 is extended, the louvers are closed; as it is retracted, the louvers are opened. During operation, Solenoid 170 is supported from and pivots on axis pins 180.

Control of louvers 80' may be in conjunction with the operation of the air conditioner system and in particular, in response to the head pressure in the system. For example, louvers 80' may be moved to a restricted or closed-down position, or partly closed position, at a lower head pressure, such as 220 psi, and moved to an opened position above this pressure. Of course, the movement of the louvers may be controlled in accordance with other parameters in the air conditioning system and movement can be controlled at any selected pressure or other parameter.

FIG. 4 shows a schematic of a typical air conditioning system 200 including a compressor 202 connected by discharge line 204 to a condensor 206. Condensor 206 is connected by line 208 to a dehydrator-receiver assembly 210, which is connected by line 212 to an expansion valve 214. Expansion valve 214 feeds an evaporator 216, and evaporator 216 is connected by line 218, via suction throttle valve 220, to a compressor 202. As can be seen in FIG. 4, a pressure sensor 230 is positioned in line 208. Sensor 230 is connected by an appropriate electrical lead 232 to solenoid 170. In the position shown, pressure sensor 230 reads head pressure of the air conditioning system 200 and may be designed to operate solenoid 170 at selected pressures, for example 220 psi, to operate louvers 80' as described above.

In operation, the unit serves both as an air deflector shield which houses the condenser for an air conditioning system and permits necessary bleed through of air into the deflector and through the condenser to serve as a heat exchange fluid. The air is then exhausted past a blower motor and out of the area behind the deflector where it joins the free stream air flow. The inlet through the deflector can be preset to allow a predetermined amount of ram air to the condenser while deflecting a portion of the air around the unit. Alternatively, the inlet to the deflector may be controlled by moveable louvers which may be completely closed where air flow through the condenser is not needed. In this mode, the deflector acts as a total deflector. The louvers may be opened in response to the head pressure in the air conditioning system and permit a selected portion of the air to be directed through the condenser and exhausted downstream to join the free air stream diverted around the deflector.

In the present invention, the condenser is connected by way of brackets to the deflector shield and may be designed as a load bearing structure to reduce the structural components necessary in the design of the shield. Further, the condenser may be mounted immediately adjacent to the inlet through the deflector shield and the condenser unit itself, and with appropriate screening may serve as a partial deflector while permitting a portion of the air to pass through the condenser. This arrangement is the most economical of those discussed but provides less control and variation for optimizing the system.

In the present invention, it has also been found that the deflector becomes more efficient by permitting a slight bleed through of air. The exhausting of air at the exhaust port, as shown in FIG. 2, adds to the flow of the free stream and disturbs any vortex which might otherwise be set up at this point in the free stream flow. Similarly, the flow of air through the deflector also serves to disturb any vortex action which might be generated behind the deflector. Thus, the present invention although permitting a small amount of air to pass through the deflector actually facilitates the aerodynamic characteristics of the deflector by deterring the generation of vortices behind or adjacent to the deflector shield.

Although preferred embodiments of the invention have been described in the foregoing Detailed Description and illustrated in the accompanying Drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

I claim:

1. An air deflector unit for use on a vehicle to improve aerodynamic flow of air around the vehicle and to house the condenser of an air conditioning system used for the vehicle comprising:
   a housing having a forward facing shield with a forward facing air inlet therein and an upwardly facing air exhaust, an air flow passage being defined between said air inlet and said air exhaust;
   means for mounting said housing in front of a portion of the vehicle to deflect air flow therearound upon forward movement of the vehicle;
   air conditioning condenser means mounted within said housing and in said air flow passage; and
   control means for controlling the opening to said air inlet in response to changes in a selected operating parameter of the air conditioning system to control the flow of air therethrough the inlet.

2. The air deflector unit according to claim 1 wherein said control means is operated in response to head pressure measured downstream of said condenser.

3. The air deflector unit according to claim 1 further comprising:
   blower means mounted within said flow stream downstream of said condenser and ahead of said air exhaust.

4. The air deflector unit according to claim 1 wherein said condenser is a load bearing structure to support said forward facing shield under dynamic loading.

5. The air deflector unit according to claim 1 wherein said inlet opening control means comprises operable louvers mounted therein and means for controlling said louvers to control the amount of air admitted therethrough.

6. The deflector unit according to claim 1 wherein said condenser is mounted to fully cover said air inlet to receive air therethrough and to act as a partial deflector of air into the inlet.

7. An air deflector-air conditioner condenser combination unit comprising:
   a housing having an aerodynamic deflector shield with an air inlet therethrough;
   an air exhaust remote from said inlet;
   an air flow path being defined between said inlet and said exhaust;
   means for mounting said housing in front of a portion of the vehicle to deflect air flow therearound upon forward movement of the vehicle;
   an air conditioner condenser mounted within said air flow path; and
   means for controlling the opening to said air inlet in response to changes in a selected operating parameter associated with the condenser to control the flow of air through the inlet.

8. The air deflector unit according to claim 7 wherein said control means is operated in response to head pressure measured downstream of said condenser.

9. The air deflector unit according to claim 7 further comprising:
   blower means mounted within said flow stream downstream of said condenser and ahead of said air exhaust.

10. The air deflector unit according to claim 7 wherein said condenser is a load bearing structure to support said forward facing shield under dynamic loading.

11. The air deflector unit according to claim 7 wherein said inlet opening control means comprises operable louvers mounted therein and means for controlling said louvers to control the amount of air admitted therethrough.

12. The deflector unit according to claim 7 wherein said condenser is mounted to fully cover said air inlet to receive air therethrough and to act as a partial deflector of air into the inlet.

13. An air deflector-air conditioner condenser combined unit for mounting on the exterior of a vehicle comprising:
   a housing having a curved deflector shield with a section defining an air opening for receiving therethrough a portion of the air engaging said shield;
   an outlet defined by said shield for exhausting said air passing into said air opening, an air flow path defined between said inlet and outlet;
   means for mounting said housing in front of a portion of the vehicle to deflect air flow therearound upon forward movement of the vehicle;
   an air conditioner condenser mounted within said housing and within said air flow path and adjacent said inlet to receive air therethrough; and
   means for controlling the opening to said air inlet in response to changes in a selected operating parameter associated with the condenser to control the flow of air through the inlet.

14. The air deflector unit according to claim 13 wherein said control means is operated in response to head pressure measured downstream of said condenser.

15. The air deflector unit according to claim 13 further comprising:
   blower means mounted within said flow stream downstream of said condenser and ahead of said air exhaust.

16. The air deflector unit according to claim 13 wherein said condenser is a load bearing structure to support said forward facing shield under dynamic loading.

17. The air deflector unit according to claim 13 wherein said inlet opening control means comprises operable louvers mounted within said inlet and further comprising means for controlling said louvers to control the amount of air admitted therethrough.

18. The deflector unit according to claim 13 wherein said condenser is mounted to fully cover said air inlet to receive air therethrough and to act as a partial deflector of air into the inlet.

* * * * *